United States Patent
Siqueira et al.

(10) Patent No.: US 10,005,401 B1
(45) Date of Patent: Jun. 26, 2018

(54) OBJECT ATTACHING SYSTEM

(71) Applicant: GM GLOBAL TECHNOLOGY OPERATIONS LLC, Detroit, MI (US)

(72) Inventors: Fernando A. Siqueira, Sao Bernardo do Campo (BR); Adelchi R. Tiboni, São Paulo (BR); Rodrigo T. Garcia, Santo André (BR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 19 days.

(21) Appl. No.: 15/640,703

(22) Filed: Jul. 3, 2017

(51) Int. Cl.
*B60R 11/00* (2006.01)
*B60R 7/12* (2006.01)

(52) U.S. Cl.
CPC ............... *B60R 7/12* (2013.01); *B60R 11/00* (2013.01); *B60R 2011/0003* (2013.01); *B60R 2011/0028* (2013.01); *B60R 2011/0059* (2013.01); *B60R 2011/0071* (2013.01)

(58) Field of Classification Search
CPC ..... B60R 2011/0028; B60R 2011/0059; B60R 2011/0003; B60R 2011/004; B60R 7/04; B60R 7/12; B60R 11/00; B60R 2011/0071; B60R 2011/0064; B60R 2021/132; B60R 2021/134; B60R 2021/135; B60R 2021/0246
See application file for complete search history.

(56) References Cited

U.S. PATENT DOCUMENTS

| | | | | |
|---|---|---|---|---|
| 5,385,161 A | * | 1/1995 | Loker | A45B 11/00 135/15.1 |
| 5,529,368 A | * | 6/1996 | Cui | A45B 11/00 135/16 |
| 5,800,004 A | * | 9/1998 | Ackeret | B60R 7/046 224/915 |
| 6,959,715 B2 | * | 11/2005 | Siegel | A45B 11/00 135/16 |
| 7,819,128 B2 | * | 10/2010 | Clark | A45B 11/00 135/16 |
| 7,967,274 B1 | * | 6/2011 | Stallings, Jr. | A45B 11/00 248/206.3 |
| 8,052,192 B2 | * | 11/2011 | Groeller | B60R 11/0205 296/37.8 |
| 8,726,921 B2 | * | 5/2014 | Wilkins | A45B 3/02 135/20.1 |
| 2015/0266428 A1 | * | 9/2015 | Ishikawa | B60R 7/12 224/558 |
| 2015/0305453 A1 | * | 10/2015 | Gatto-Weising | A45B 11/00 248/516 |

* cited by examiner

*Primary Examiner* — Nkeisha Smith

(57) ABSTRACT

A system to releasably attach an object to a vehicle interior is presented herein. The system includes a first, second and third module. The first module is configured to fasten to a portion of an interior vehicle body panel. The second module is configured to slidably couple to the first module. The third module is configured to rotatably couple to the second module, the third module has a connection point configured to allow the releasable attachment of the object.

19 Claims, 5 Drawing Sheets

OBJECT ATTACHING SYSTEM

INTRODUCTION

Many young parents have the difficult task of placing their children into and removing their children from car seats in their vehicle. This often can be a whole body experience. As a result, when it is raining, these parents do not have an extra arm for holding an umbrella and keeping themselves from getting wet. Accordingly, it is desirable to keep parents dry while putting children into and removing children from their vehicle.

SUMMARY

A system to releasably attach an object to a vehicle interior is presented herein. The system includes a first, second, and third module. The first module is configured to fasten to a portion of an interior vehicle body panel. The second module is configured to slidably couple to the first module. The third module is configured to rotatably couple to the second module, the third module has a connection point configured to allow the releasable attachment of the object. A substantial portion of the third module may be located near the vehicle exterior when the object is releasably attached to the connection point. The second module may have an object stabilizing device configured to stabilize the object when releasably attached to the third module. The object stabilizing device may moreover be a hook configured to allow for the releasable attachment of an object strap. The first module may include a rail system and the second module may be configured to correspond with the rail system so as to slidably couple to the first module. The first module may have two tying structures configured to fasten an assist grip to the vehicle body panel. Each of the first, second, and third modules may be manufactured from plastic, metal, rubber, wood, or fiberglass.

A system to releasably attach an object to a vehicle interior such that the object can be located near a vehicle exterior is also presented herein. The system includes: an assist grip, the object, as well as a first, second, and third module. The first module is configured to fasten to a portion of an interior vehicle body panel and includes a rail system and two tying structures are configured to fasten the assist grip to the vehicle body panel. The intermediate second module is configured to slidably couple to the rail system. The third module is configured to rotatably couple to the second module and includes a connection point. The object is configured to interlock with the connection point and releasably attach to the third module.

A substantial portion of the third module may be located near the vehicle exterior when the object is releasably attached to the connection point. The second module may include an object stabilizing device configured to stabilize the object when attached to the third module. The object stabilizing device may be a hook configured to allow for the releasable attachment of an object strap. Each of the first, second, and third modules may be manufactured from plastic, metal, rubber, wood, or fiberglass. The object may be an umbrella. Each of the first, second, and third modules may similarly have a substantially rectangular shape.

A method to releasably attach an object to a vehicle interior is also presented herein. The method includes the steps of: providing a first module fastened to a portion of an interior vehicle body panel; providing an intermediate second module slidably coupled to the first module; providing a third module rotatably coupled to the second module, the third module including a connection point configured to allow the releasable attachment of the object; slidably positioning the second module to be fully extended from the first module; rotatably positioning the third module such that a substantial portion of the third module is located at the vehicle exterior; and releasably attaching the object to the connection point of the third module such that the object is located near the vehicle exterior.

In one or more embodiments, the second module may include a hook. In such embodiments, the method further includes the step of releasably attaching an object connected strap to the hook so as to stabilize the object while releasably attached to the third module. The first module may include a rail system and the second module may be configured to correspond with the rail system so as to slidably couple to the first module. The first module may include two tying structures configured to fasten an assist grip to the vehicle body panel. Each of the first, second, and third modules may be manufactured from plastic, metal, rubber, wood, or fiberglass. The object may be an umbrella.

The above features and advantages and other features and advantages of the present teachings are readily apparent from the following detailed description for carrying out the teachings when taken in connection with the accompanying drawings.

DETAILED DESCRIPTION

Figure 1:
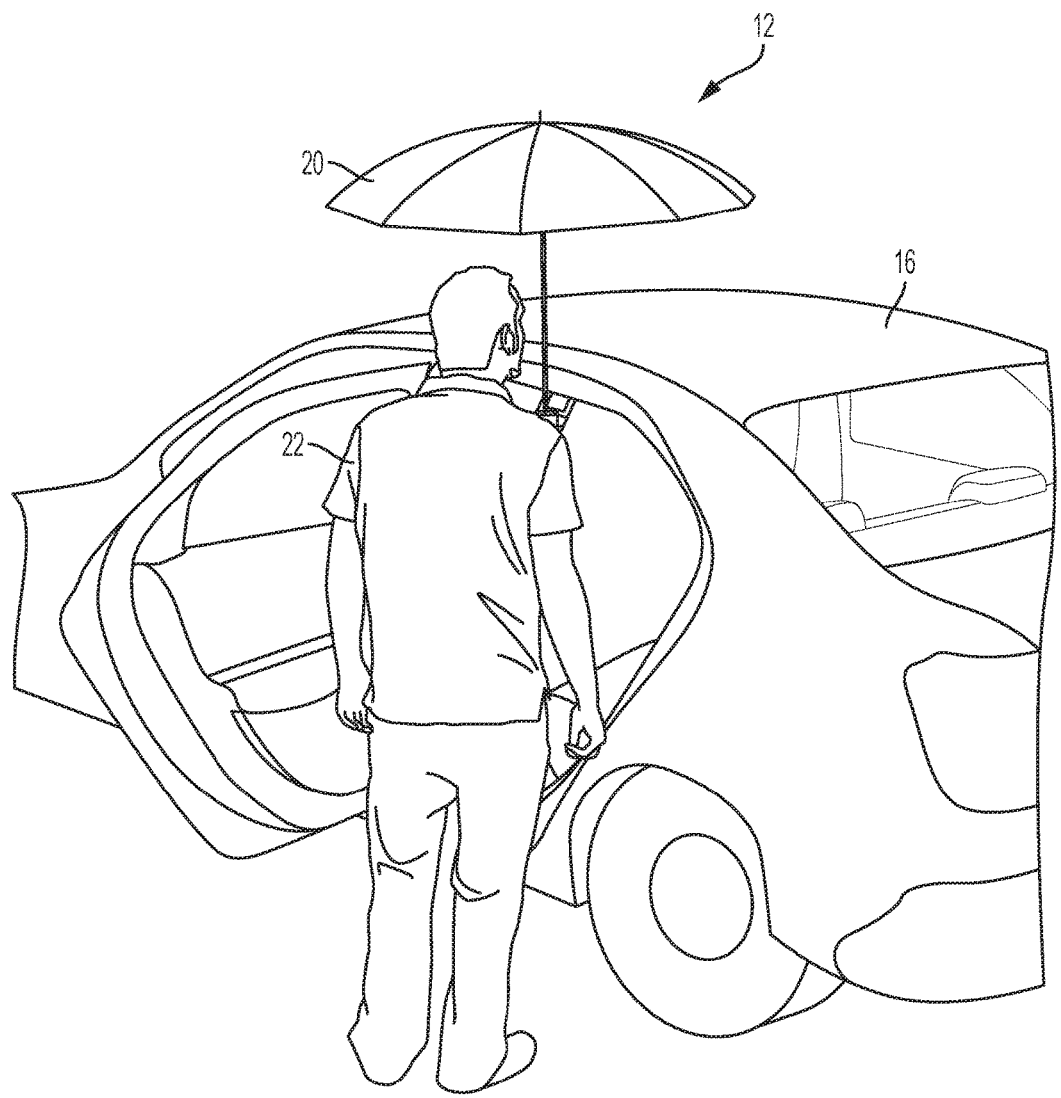
FIG. 1 is an environmental view of the object attaching system in use and according to an aspect of the present disclosure.
Figure 2:
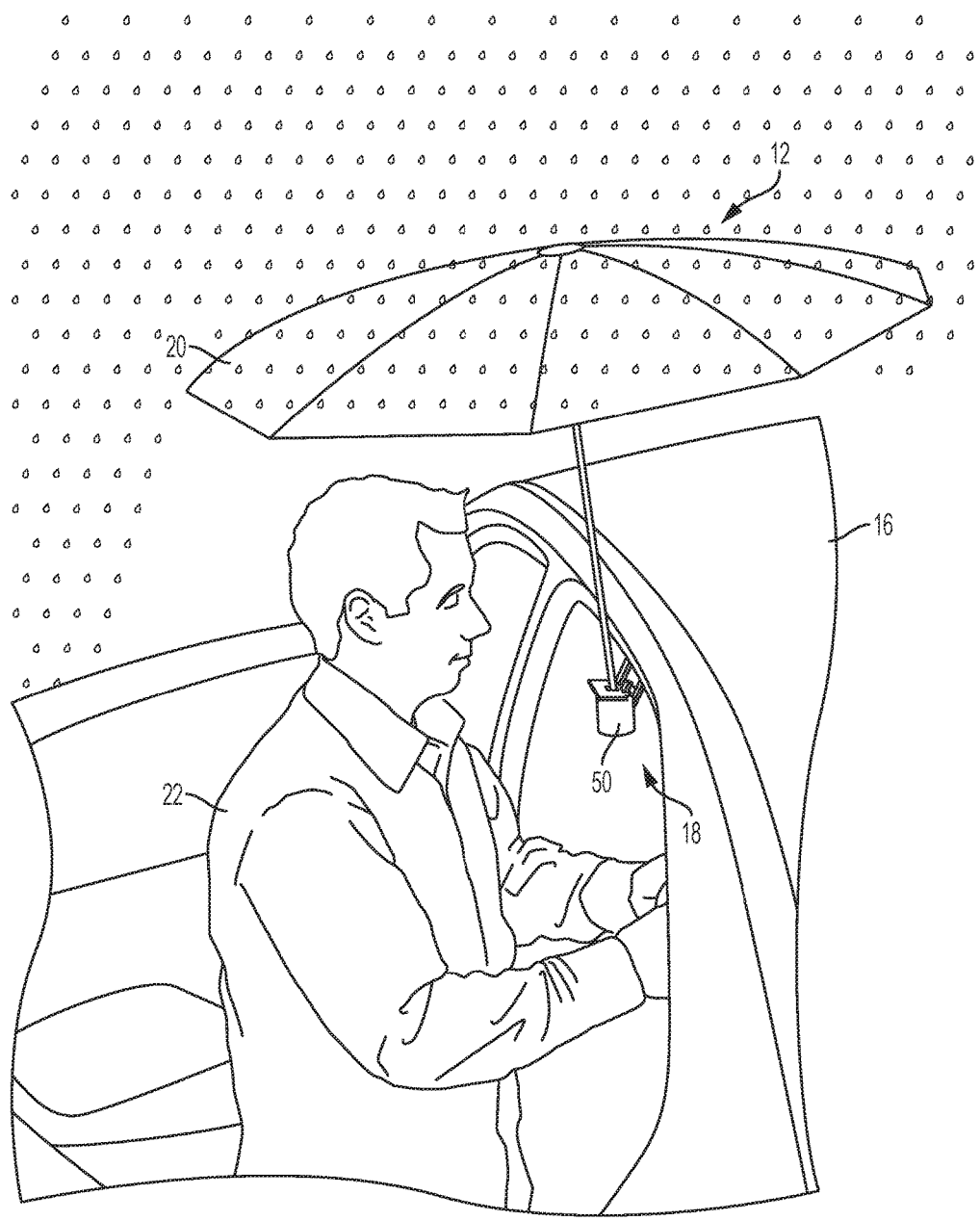
FIG. 2 is another environmental view of the object attaching system of FIG. 1 in use and according to an aspect of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

FIGS. 1 through 3B, an object attaching system has generally been indicated by reference numeral 10. System 10 allows an object 12 such as, but not limited to, an umbrella to releasably attach to a vehicle interior 14 while remaining outside of the vehicle 16. As follows, a substantial portion of system 10 extends from the vehicle interior 14, through the open space of the rear passenger seat entrance 18, and to the space located outside of the vehicle 16. System 10 moreover holds umbrella 12 vertically erect, as shown, so that its canopy 20 can cover entrance 18. This allows umbrella 12 to cover a parent 22 from being rained on (see FIG. 2), while placing their child (or other objects such as, but not limited to, groceries) into the backseat of vehicle 16.

Figure 3A:
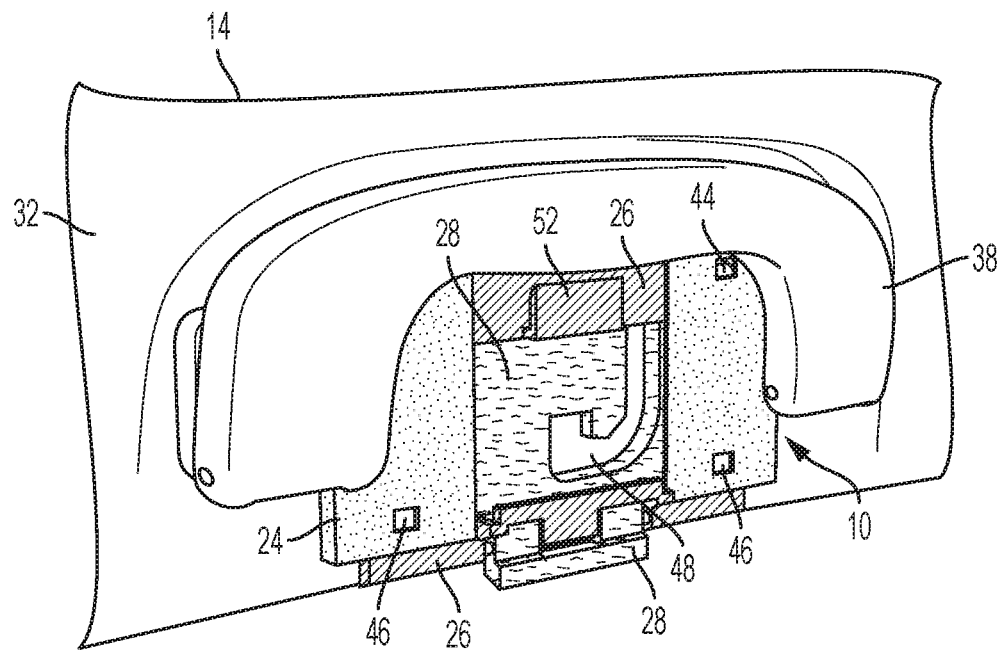
FIG. 3A is a perspective view of the object attaching system of FIG. 1 according to an aspect of the present disclosure.
Figure 3B:
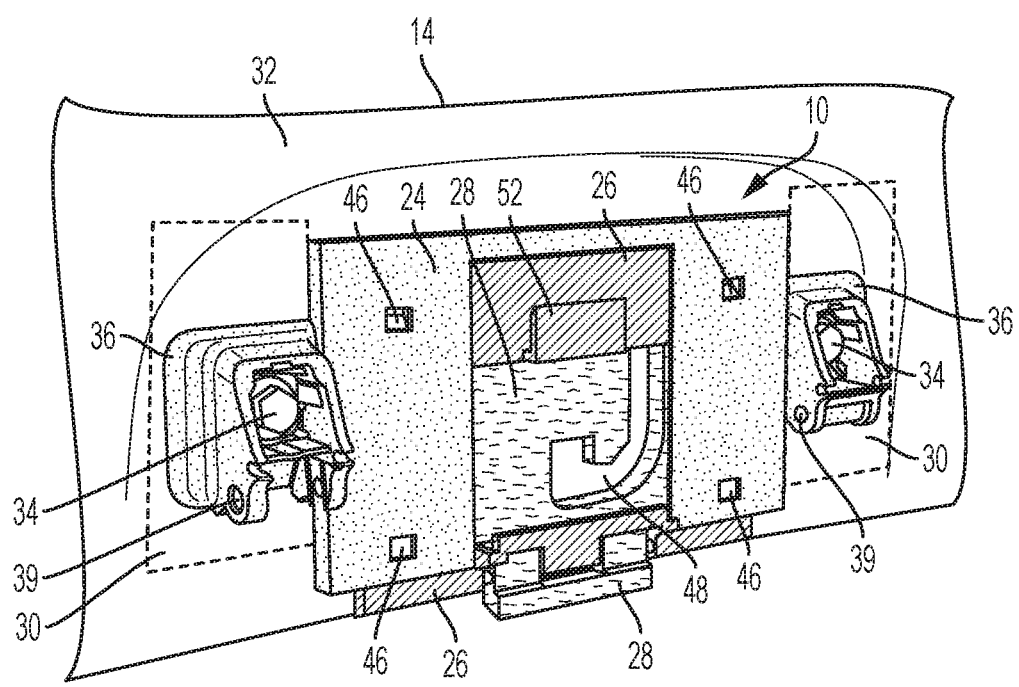
FIG. 3B is a perspective view of the object attaching system of FIG. 1 according to another aspect of the present disclosure.

With further reference to FIGS. 3A and 3B, system 10 incorporates three distinct and fundamental components—a first module 24, an intermediate second module 26, and a third module 28—each of which having a rectangular shape and interlocking into system 10 in an independent and unique manner. In addition, each of these modules 24, 26, 28 can be manufactured from materials such as, but not limited to, plastic, metal, rubber, wood, or fiberglass and each are not necessarily required to all be manufactured from the same material as the other modules. Furthermore, each side of first module 24 generally fastens to a bracket/plate 30 installed beneath the upholstery of an interior vehicle body panel 32. In conjunction, the brackets/plates 30 provide stability for system 10 and system 10 is generally fastened to these brackets/plates 30 via joining mechanisms 34 such as, but not limited to, screws or bolts. Tying structures 36 are moreover located at both fastening points and generally surround the corresponding joining mechanism 34. These tying structures 36 are generally known to work in conjunction so as to swingably attach an assist grip 38 (i.e., headline handle) to body panel 32. As such, a pin extending through each side of assist 38 and orifaces 39 on each tying structure 36 allow the grip to become swingably attached to body panel 32.

Figure 4:
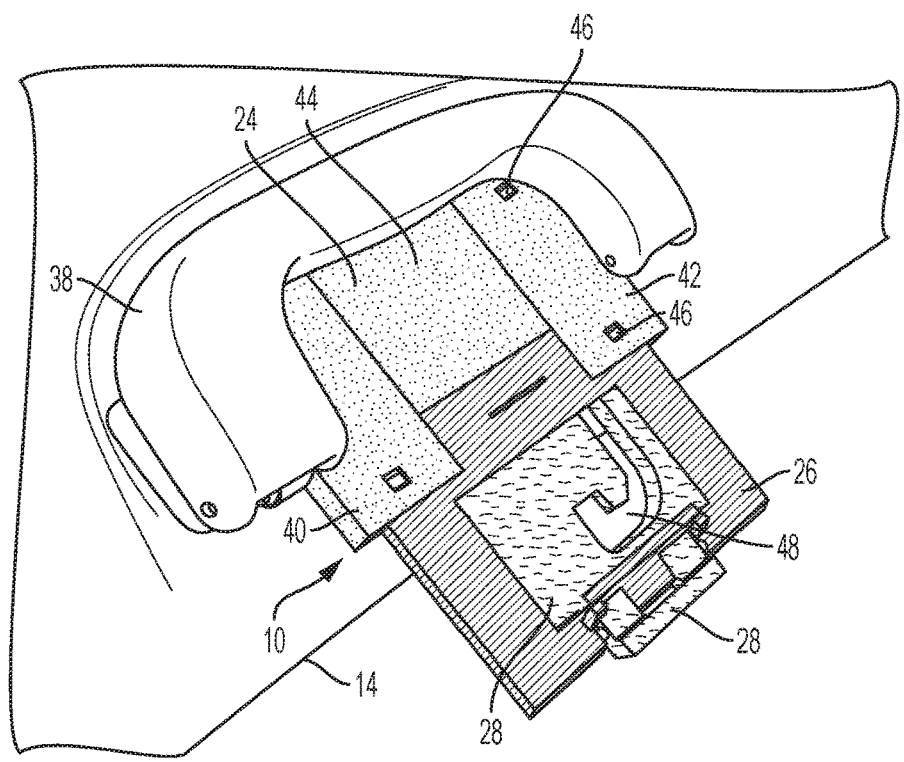
FIG. 4 is a perspective view of the object attaching system of FIG. 1 according to another aspect of the present disclosure.
Figure 5:
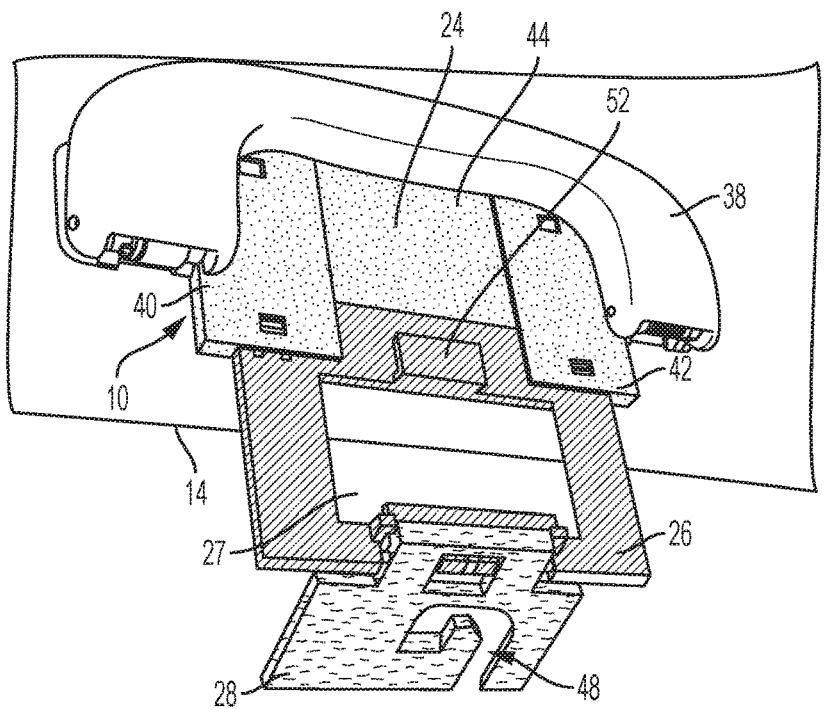
FIG. 5 is a perspective view of the object attaching system of FIG. 1 according to another aspect of the present disclosure.

With reference to FIGS. 4 and 5, first module 24 incorporates a rail system that includes two corresponding retainers, a first and second retainer 40 and 42, respectively. Retainers 40 and 42 are similar and together align to define a pocket 44 in which the second module 26 inserts into and can slide in a telescopic manner. Notches 46 in retainers 40 and 42 stop second module 26 from telescopically sliding beyond a certain range, for example, from sliding out of pocket 44 and thus accidentally falling out of first module 24.

Figure 6:
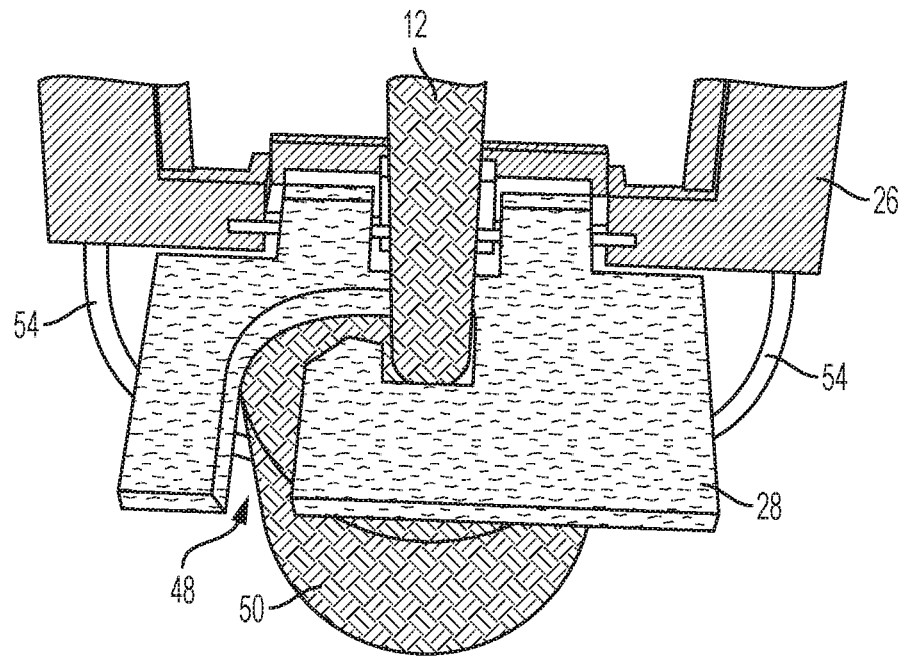
FIG. 6 is a perspective view focused on the third module of the object attaching system of FIG. 1 according to another aspect of the present disclosure.
Figure 7:
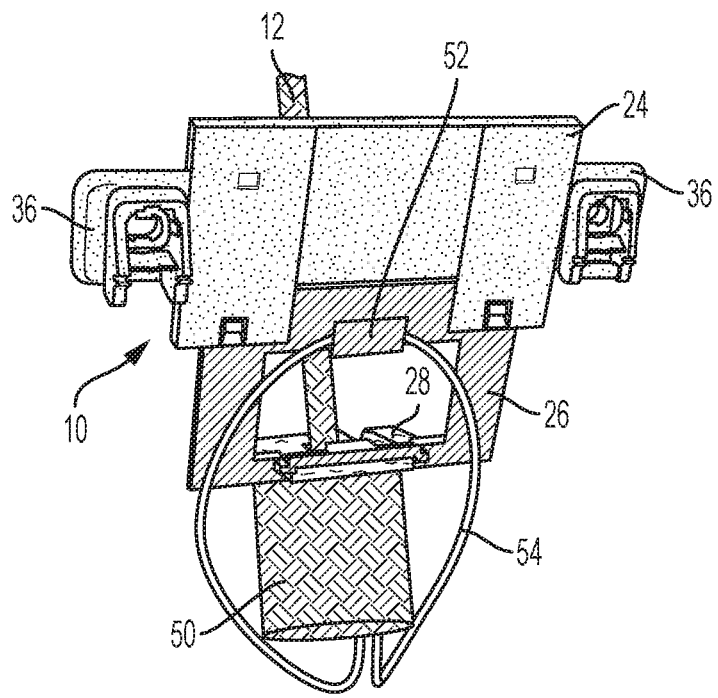
FIG. 7 is a perspective view focused on the backside of the second module of the object attaching system of FIG. 1 according to another aspect of the present disclosure.

Third module 28 is rotatably coupled in a lengthwise manner to the side of the second module 26 that can be extended furthest away from first module 24. As a result, third module 28 may rotate into and line up with a corresponding central opening 27 of second module 26. This allows both the second and third modules 26 and 28 to simultaneously slide telescopically into first module 24 (see FIGS. 3A and 3B). Conversely, third module 26 may rotate outwardly such that a substantial portion of its body extends outwardly through entrance 18 and is thus located near the vehicle exterior 16 (e.g., 2-5 inches from the top edge of entrance 18—see FIG. 2). A connection point 48, which may, for example, be a "J" shaped slit throughout the body of third module 28, allows umbrella 12 to attach to and detach from system 10. With reference to FIG. 6, the umbrella tube 12 interlocks into connection point slit 48, just above handle 50. With reference to FIG. 7, an object stabilizing device 52, for example a rectangular hook, is located on the backside of the intermediate second module 26. A strap 54, attached to handle 50, wraps around hook 52 in a gravitationally-made-tight fashion to stabilize umbrella 12 while attached to system 10. Thus, while attached, as the weight of umbrella 12 pushes handle 50 downward and towards the ground, the strap 54 will become tight around hook 52 and the tense strap 54 will cause umbrella 12 to stay up and stabilize.

Referring back to FIGS. 1-5, application of system 10, to releasably attach an umbrella 12 to a vehicle interior 32 such that the umbrella is located near the vehicle exterior 16 (e.g., 2-7 inches away from the exterior, depending on the angle of erection), can be simple and quick. First, a parent 22 is required to slidably position second module 26 to be fully extended outwardly from within first module 24 (see FIG. 4). In a second step, the parent 22 is required to rotatably position the third module 28 to extend out of and be in a location exterior to vehicle 12 (see FIG. 5). Once in place, in a third step, the parent 22 needs to releasably attach umbrella 12 to connection point 48. This should allow umbrella 12 to be at a location which is exterior to vehicle 16 (see FIGS. 1 and 2). In an optional step, parent 22 may attached an umbrella strap 54 to the stabilizing hook 52 so as to stabilize umbrella 12 while releasably attached to system 10 (see FIG. 7). As such, when these steps are followed, the parent 22 may place/remove their child from within the vehicle while avoiding the falling rain drops.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system to releasably attach an object to a vehicle interior, the system comprising:
   a first module configured to fasten to a portion of an interior vehicle body panel, wherein the first module comprises two tying structures fastening an assist grip to the vehicle body panel;
   a second module configured to slidably couple to the first module; and a third module configured to rotatably couple to the second module, the third module comprising a connection point configured to allow the releasable attachment of the object.

2. The system of claim 1, wherein a substantial portion of the third module is located near the vehicle exterior when the object is releasably attached to the connection point.

3. The system of claim 1, wherein the second module comprises an object stabilizing device configured to stabilize the object when releasably attached to the third module.

4. The system of claim 3, wherein the object stabilizing device is a hook configured to allow for the releasable attachment of an object strap.

5. The system of claim 1, wherein:
the first module comprises a rail system; and
the second module configured to correspond with the rail system so as to slidably couple to the first module.

6. The system of claim 1, wherein each of the first, second, and third modules are manufactured from plastic, metal, rubber, wood, or fiberglass.

7. A system to releasably attach an object to a vehicle interior such that the object can be located near a vehicle exterior, the system comprising:
an assist grip;
a first module configured to fasten to a portion of an interior vehicle body panel, the first module comprising a rail system, the first module comprising two tying structures configured to fasten the assist grip to the vehicle body panel;
an intermediate second module configured to slidably couple to the rail system;
a third module configured to rotatably couple to the second module, the third module comprising a connection point; and
the object configured to interlock with the connection point and releasably attach to the third module.

8. The system of claim 7, wherein a substantial portion of the third module is located near the vehicle exterior when the object is releasably attached to the connection point.

9. The system of claim 7, wherein the second module comprises an object stabilizing device configured to stabilize the object when attached to the third module.

10. The system of claim 9, wherein the object stabilizing device is a hook configured to allow for the releasable attachment of an object strap.

11. The system of claim 7, wherein each of the first, second, and third modules are manufactured from plastic, metal, rubber, wood, or fiberglass.

12. The system of claim 7, wherein the object is an umbrella.

13. The system of claim 7, wherein each of the first, second, and third modules have a substantially rectangular shape.

14. A method to releasably attach an object to a vehicle interior, the method comprising:
providing a first module fastened to a portion of an interior vehicle body panel;
providing an intermediate second module slidably coupled to the first module;
providing a third module rotatably coupled to the second module, the third module comprising a connection point configured to allow the releasable attachment of the object;
slidably positioning the second module to be fully extended from the first module;
rotatably positioning the third module such that a substantial portion of the third module is located at the vehicle exterior; and
releasably attaching the object to the connection point of the third module such that the object is located near the vehicle exterior.

15. The method of claim 14, further comprising:
wherein the second module comprises a hook; and
releasably attaching an object connected strap to the hook so as to stabilize the object while releasably attached to the third module.

16. The method of claim 14, wherein:
the first module comprises a rail system; and
the second module configured to correspond with the rail system so as to slidably couple to the first module.

17. The method of claim 14, wherein the first module comprises two tying structures configured to fasten an assist grip to the vehicle body panel.

18. The method of claim 14, wherein each of the first, second, and third modules are manufactured from plastic, metal, rubber, wood, or fiberglass.

19. The method of claim 14, wherein the object is an umbrella.

* * * * *